United States Patent Office 3,344,122
Patented Sept. 26, 1967

3,344,122
MODIFIED AROMATIC POLYAMIDE RESIN
Mahlon J. Perrine, Seattle, and Douglas C. Babcock, Bellevue, Wash., assignors to Weyerhaeuser Company, Tacoma, Wash., a corporation of Washington
No Drawing. Filed Mar. 15, 1963, Ser. No. 265,357
3 Claims. (Cl. 260—78.5)

This invention relates to a water dispersible, thermosetting resin of the polyamide type and to its manufacture and use. In particular, the resin comprises the partially cross-linked reaction product of isophthalic acid and a polyalkylene polyamine.

The resin product is water dispersible and thermosetting and, consequently, finds utility in a variety of applications. It is especially useful in the field of paper manufacture as a wet strengthening agent. It is also useful as a flocculating agent to increase the filler or pigment retained in paper, as an adhesive for wood and paper, and as a binder in various coating compositions.

The resin is cationic in water solution and is specifically attracted to and retained by anionic cellulosic fibers. When small amounts of the resin are dispersed in a paper furnish the resin will be specifically retained by the paper fibers when the fibers are separated from the water. In this way small amounts of resin will confer substantial wet strength to the paper and very little resin will be lost in the white water.

The resin has the property of curing over a pH range from slightly acid to alkaline. The resin, therefore, is particularly useful in providing wet strength in paper containing alkaline fillers or in paper which must be dried on the alkaline side to provide softness.

It is an object of this invention to provide a polyamide resin based on isophthalic acid which is water soluble and thermosetting. It is also an object of the invention to provide a water soluble resin which is substantive to cellulosic fibers and which will cure under mildly acid or alkaline conditions.

Isophthalic acid is a very desirable raw material for resins because it is substantially less expensive than the conventional aliphatic dicarboxylic acids such as adipic acid. While it is known to prepare polyamide resins from isophthalic acid, these resins have not been successfully used as wet strengthening agents because of the difficulty of producing them in a water soluble, thermosetting state. To be useful for wet strengthening paper, a resin must be readily soluble in water in order to be uniformly distributed throughout the paper furnish, and it must be thermosettable to insure that the resin will not be leached from the paper. It should also be strongly attracted to the paper fibers to minimize resin losses during sheet formation.

This invention comprises the discovery of the specific materials, their proportions, and the reaction conditions required to produce a thermosetting polyamide resin from isophthalic acid which is water soluble, substantive to cellulosic fibers, and especially useful as a wet strengthening agent.

In accordance with the invention the resin is prepared in two separate steps. The first step comprises the formation of a solid pre-polymer by reacting isophthalic acid with triethylene tetramine or mixtures of diethylene triamine and triethylene tetramine. In the second step the pre-polymer is reacted with a cross-linking agent to form the finished resin.

The cross-linking agent may, for example, be an epihalohydrin such as epichlorohydrin, or a complex poly-functional material such as the reaction product of an epihalohydrin with ammonia. The preferred amine is triethylene tetramine and the preferred cross-linking agent is the reaction product of epichlorohydrin with ammonia.

In the first step the desired pre-polymer is formed by a condensation reaction between the carboxyl groups of the isophthalic acid and the primary amine groups of the polyamine to form an essentially linear polyamide. Since the isophthalic acid molecule contains two carboxyl groups and triethylene tetramine contains two primary amine groups per molecule, it is desirable to react the acid with the amine at a molar ratio of about 1 to 1. When a mixture of diethylene triamine and triethylene tetramine is employed 1 mole of isophthalic acid should be reacted with about 2 moles of the total primary amine groups present as the mixture. Some variation of the ratio is permissible, but if too much isophthalic acid is present reaction with the secondary amine groups of the polyamine may take place and an insoluble and useless pre-polymer may be formed. If too little isophthalic acid is present, the minimum molecular size of pre-polymer will not be obtained.

During the pre-polymer formation water is formed. This water is distilled from the reacting mass to avoid dilution and slowing of the reaction. Some grades of the amine will contain water as an impurity, and this water will, of course, be distilled from the reacting mass at a lower temperature than the water formed from the polyamide reaction.

As the reaction proceeds and the water is removed the extent of condensation gradually increases. It has been determined that the extent of condensation of the pre-polymer is critical to the use of the final resin for wet strength or adhesives. Direct measurement of the extent of condensation of such a polymer is difficult, but its intrinsic viscosity has been found to be a satisfactory indicia of the desired state of condensation.

The intrinsic viscosity is the value obtained by extrapolating to zero concentration a curve obtained by plotting the reduced specific viscosity of the pre-polymer in the solvent. In the examples which follow the intrinsic viscosity of the pre-polymer was measured by the following procedure using a capillary viscometer (Ostwald-Cannon-Fenske type) immersed in a 20° C. water bath.

A solvent for the pre-polymer was first prepared by mixing equal parts by volume (measured at 25° C.) of pyridine and water. Three solutions of different concentrations of the pre-polymer in the solvent were then prepared accurately in volumetric flasks. The solutions contained respectively 0.3, 0.6, 0.9 gram of solid pre-polymer per 100 mls. of solution at 20° C. The relative viscosity of the solution and the pure solvent was then measured by determining the times required for a given volume of the solution and the solvent to flow through the capillary tube of the viscometer.

The pure solution and the solutions containing the pre-polymer have different densities and a correction for the time of flow through the viscometer due to the difference in pressure head caused by the difference in densities was made. For this purpose the density of the solvent and each solution was determined at 20° C. by the pycnometer method. The corrected relative viscosity was then used to calculate the specific viscosity of the pre-polymer solution. The specific viscosity of each solution was then divided by the concentration of the solution and this value was then plotted against the concentration of the solution. An extrapolation of the curve to zero concentration was then made. The intrinsic viscosity of the pre-polymer was then the specific viscosity at zero concentration.

The first step of the reaction (pre-polymer formation) is conducted by heating the proper mixture of isophthalic acid and triethylene tetramine to above about 180° C. and simultaneously distilling the reaction water from the reacting mass. The distillation of water formed in the condensation begins at about 180° C. for a pre-polymer formed with triethylene tetramine, and as the water is removed the temperature gradually rises. For a polymer containing diethylene triamine in addition to triethylene tetramine the water begins to distill at somewhat lower temperature; i.e., 160°–170° C.

During the course of pre-polymer formation the intrinsic viscosity of the pre-polymer will gradually increase, indicating a progressive increase in the size of the pre-polymer molecule due to repeated formation of amide linkages. The desired pre-polymer is of sufficient molecular size to constitute a solid if it is cooled to room temperature. The intrinsic viscosity of the desired pre-polymer is between about 0.090 and 0.150 when measured as previously described.

Since it is impractical to measure the intrinsic viscosity during the course of the reaction to determine the proper termination point it is convenient for commercial production purposes to prepare the polymer on a time-temperature basis. Using pure triethylene tetramine it has ben determined that the correct pre-polymer is formed when the mixture is allowed to increase from about 180° C. to 220° C. in 130 minutes of elapsed time. Such a pre-polymer will have the required intrinsic viscosity of from 0.090 to 0.150 and will form a suitable water-soluble, thermosetting resin for wet strength applications when partially cross-linked according to the second step of the process.

The extent of the reaction may also be checked by measuring the amount of water removed from the reacting mass during the amide condensation. When the reaction has progressed to the desired point a weight of water equal to about 19–23% of the isophthalic acid weight charged will have been removed.

When the pre-polymer reaction is finished, the reaction is terminated by cooling below the reaction temperature. If the pre-polymer is made with pure triethylene tetramine, cooling below about 180° C. is sufficient to terminate the reaction. If the mixed amines are used, the reaction will be terminated by cooling below about 160° C.

The pre-polymer need not be cooled to a solid condition if it is to be used immediately in the second reaction step. The molten pre-polymer, cooled only enough to terminate its reaction, may be added to a solution of the cross-linking agent directly. Such addition should be gradual to avoid an excessive reaction rate locally where the molten polymer contacts the cross-linking agent. Good agitation is important if this technique is employed.

The finshed pre-polymer is most conveniently removed from the reaction equipment while it is in a molten condition. It is then normally allowed to cool to room temperature during which time it becomes a brittle, clear, amber colored solid. The pre-polymer may be stored indefinitely in this condition until it is desired to subject it to partial cross-linking to form the finished resin.

The second reaction step is the partial cross-linking of the pre-polymer with the poly-functional cross-linking agent. The cross-linking agent is used in sufficient quantity to eventually react with all the available secondary amines in the pre-polymer to form the final thermoset resin. Preferably one mole of cross-linking agent is present in the reacting mixture for each mole of secondary amine groups, although some variation from this proportion is possible, since at this stage only partial cross-linking takes place. It is possible, therefore, to use from about 0.9 to 1.5 moles of cross-linking agent per mole of secondary amine groups.

The cross-linking reaction is carried out at temperatures between about 55° and about 80° C., preferably at about 75° C. In the later stages the temperature may be reduced to about 65° C. to moderate the rate of reaction.

Normally the reaction is carried out in the presence of water or a mixture of water and methanol. The amount of solvent present is not critical and is usually chosen to provide easy control of the reaction rate and a final viscosity for the resin that permits easy handling. A typical resin will have a final viscosity from 50 to 85 centistokes at 25° C. and 20% solids content.

To conduct the second stage reaction the correct amount of cross-linking agent is first placed in the reactor at room temperature. Solvent in the form of water or a water-methanol mixture is then added in an amount to facilitate stirring followed by the correct amount of pre-polymer. The mass is then stirred and gradually heated to the reaction temperature range.

The reaction may be followed by measuring the viscosity of the solution since this gradually increases as the extent of cross-linking increases. To facilitate measuring the viscosity in the early stages of the reaction, it is desirable to maintain the solids content of the solution as high as possible. As the reaction continues and the viscosity increases, increments of water and/or methanol can be added to keep the viscosity within a measurable range. The reaction is terminated by cooling the mixture below about 40° C., preferably to below 25° C.

While several types of polyfunctional cross-linking agents may be used it is preferred to use the reaction product of epichlorohydrin and ammonium hydroxide.

This material is prepared by reacting one mole of ammonium hydroxide with from two to three moles of epichlorohydrin. The reaction is highly exothermic and it is therefore best to add the ammonium hydroxide incrementally to the epichlorohydrin in a vessel equipped for cooling. Six equal increments have been found to be suitable in commercial production, allowing a 30-minute reaction time for each increment.

The temperature of the reaction should be controlled by cooling means or by reducing the size or rate of addition of the ammonium hydroxide increments as necessary. The reaction is preferably conducted at 50°–55° C. until all the ammonium hydroxide and epichlorohydrin have been reacted. Thereafter the product is cooled to 25° C.

Production of resin by the process of the invention is facilitated by preparing the cross-linking agent described above in a resin kettle and then continuing the second resin reaction step in the same kettle by adding the correct amount of previously prepared pre-polymer to the kettle contents. Of course, either the cross-linking agent or the pre-polymer may be prepared ahead of time and stored separately until it is desired to complete the second reaction step.

The final resin should be acidic to maintain the best storage life. The pH should be adjusted to between about 2.5 to 3.5 after the resin is finished. This may be accomplished by adding formic acid or sodium hydroxide as needed. Hydrochloric acid or other alkali hydroxides or carbonates are also suitable for pH adjustment.

Wet-strengthened paper is produced by adding the liquid resin to the paper furnish. This addition may take place at any convenient point in the paper-making system prior to sheet formation. The resin may be added, for example, at the end of the beater cycle, at the consistency regulator, in the machine chest, or at the fan pump.

The amount of resin to be added to the paper is dependent on the degree of wet strength desired. In general, amounts up to about 2% of resin solids based on the dry fiber weight give adequate wet strength. Amounts over 2% may be added, however, some reduction in the absorbency in the paper may result. If this reduction in absorbency is acceptable in the specific type of paper being made, larger amounts of resin may be added.

The invention is illustrated in the following examples, but it is to be understood that the invention is not limited thereto. In all cases, the proportions are expressed in parts by weight or percentage by weight.

*Example 1*

This example illustrates the preparation of a pre-polymer from isophthalic acid and triethylene tetramine.

A resin kettle equipped with a condenser and provided with agitation and heating and cooling means was provided. Into the kettle was placed 46.82 parts of pure triethylene tetramine containing 1.21% of water followed by 53.18 parts of isophthalic acid. The acid was added gradually over a 20-minute period during which time the temperature was allowed to rise to about 90° C. Agitation of the kettle contents was continuous after the acid addition was started. The proportions were equivalent to a molar ratio of 1 to 1.

After all the acid was added the kettle was closed, the condenser opened to the atmosphere, and dry nitrogen gas was admitted to the kettle to purge the atmosphere over the kettle contents of air. A slight pressure of about 2 to 4 p.s.i. was maintained in the kettle.

Heat was then applied to raise the temperature of the kettle contents to 180° C. in about 35 minutes, and at 180° C. the nitrogen gas purge was discontinued.

At 180° C. the condenser was arranged to collect the water distilling from the reacting mixture and measurement of the distillate collected was commenced.

Heat was applied to the kettle contents so their temperature rose uniformly from 180° C. to 212° C. in 130 minutes from the time the distillate collection was started. Five minutes before reaching 212° C. the nitrogen gas was again admitted to the kettle at a pressure of 5–10 p.s.i. A total of 11.07 parts of water were collected by the time the temperature reached 212° C., which is 20.8% of the isophthalic acid charged.

When the temperature reached 212° C. a bottom discharge valve on the kettle was opened and the molten prepolymer discharged into clean, dry cooling pans. The slight gas pressure aided rapid discharge of the kettle contents.

The pre-polymer was allowed to cool to room temperature whereupon it became a hard, brittle, amber-colored solid in the pans. The pre-polymer was broken into coarse lumps and then passed through a hammer mill grinder to produce a ground product that would all pass through a screen having 11.2 millimeter openings.

The pre-polymer had the following constants:

Water content: 1.41% by Karl Fischer titration. pH of a 40% solids water solution: 9.4 measured at 45° C. Intrinsic viscosity: 0.094.

*Example 2*

This example illustrates the preparation of the preferred cross-linking agent from ammonium hydroxide and epichlorohydrin.

A resin kettle similar to that described in Example 1 was charged with 32.7 parts of water and 13.1 parts of epichlorohydrin. The mixture was continuously agitated and heated to 50° C.

Thereafter, a total of 4.7 parts of 28% strength ammonium hydroxide was added to the kettle contents. The 4.7 parts of ammonium hydroxide was divided into six approximately equal increments before addition, and after each increment was added a reaction time of 30 minutes was permitted before the next increment was added. During the reaction time the temperature of the kettle contents was maintained between 50° and 55° C.

The piping for the ammonium hydroxide addition was arranged so that the ammonium hydroxide was admitted to the kettle beneath the surface of the epichlorohydrin-water mixture.

Following the addition of the sixth increment of ammonium hydroxide the kettle contents were held for 30 minutes at 50°–55° C. Thereupon the contents were cooled at 25° C.

*Example 3*

This example illustrates the prepartion of a liquid thermosetting water dispersible resin from the reaction products of Examples 1 and 2.

The cross-linking agent prepared in Example 2 was allowed to remain in the kettle. With the agitator in operation and the temperature at 25° C., 6.0 parts of the pre-polymer of Example 1 were added to the kettle.

The mixture was then heated to 75° C. in 30 minutes and then held at 75° C. The viscosity of the kettle contents was measured at 10 to 20 minute intervals by withdrawing a sample, cooling it rapidly to 25° C. and then measuring the viscosity of the sample.

When the resin reached a viscosity of 65 centistokes @ 25° C. the temperature was reduced to 65° C. and maintained while further viscosity measurements @ 25° C. were made at progressively shorter intervals of time. Five minutes after the viscosity reached 213 centistokes 43.0 parts of water were added and the resin was cooled to 25° C.

Thereafter a small amount of 90% strength formic acid was added to adjust the pH to between 2.8 and 3.1.

The final resin had the following constants:

Solids content _____percent__ 20.5
Viscosity @ 25° C. _____centistokes__ 65
pH @ 25° C. _____ 2.95
Sp. grav. @ 25°/25° C. _____ 1.076

*Example 4*

This example illustrates the preparation of wet strengthened paper from the resin of Example 3.

Bleached Western soft wood sulfite pulp was mixed with water to a consistency of 1.5% and beaten to a Canadian standard freeness of 430–450 ml.

After beating, the slurry was diluted to 0.41% consistency and divided into 500 ml. aliquots. Each aliquot then contained 2.07 grams of fiber (oven dry basis). Each aliquot was used to make a 19.7 cm. diameter handsheet on a Valley sheet mold. The basis weight of the sheets were found to be 68–70 grams/square meter.

The resin produced according to Example 3 was diluted with water and a portion of the dilute solution added to each aliquot of pulp slurry. The amount of resin solution added was chosen to provide 0.5% of resin solids based on the weight of dry pulp. After 1¼ minutes from the time the resin was added to the pulp slurry, the slurry was poured into the sheet mold. Thereafter a handsheet was formed as described in Technical Association of the Pulp and Paper Industry (TAPPI) Method No. T205m–58.

The sheets were air dried and then subjected to a cycle of 30 seconds drying in an infrared oven to approximate the "off machine" curing conditions of a paper mill.

Other handsheets prepaed similarly were further heated at 105° for 20 minutes in a forced air circulating oven to approximate the natural aging and curing of the resin in paper rolls which are stored. This treatment is known as "total cure."

The handsheets were tested for wet strengths in accordance with TAPPI test method T–456–m–49. In brief, the handsheets were cut into strips 0.5 inch by 3 inches and these strips were saturated with water and broken wet in a paper tensile tester using a gap between the grips of about 2 inches. The results are reported herein as pounds of breaking strength per inch of paper width.

Control sheets were also made following the above procedure but no resin was added to the pulp slurry. These sheets were also tested as described above for wet tensile values.

The test results are shown in the following table.

TABLE A

| Resin Content of Handsheet | Wet Tensile Strength in lbs./inch of width | |
|---|---|---|
| | Off Machine Condition | Total Cure Condition |
| 0% (control sheet) | 0.55 | 0.9 |
| 0.5% | 2.65 | 3.70 |

*Example 5*

This example describes a pre-polymer made from a mixture of diethylene triamine and triethylene tetramine and isophthalic acid.

A laboratory resin kettle was charged with 432 parts of water and 1452 parts of isophthalic acid. Thereafter 1116 parts of a mixture of diethylene triamine and triethylene tetramine were added slowly over a 15 minute period. The amine mixture comprised a ratio of 1 mole of diethylene triamine to 1.26 moles of triethylene tetramine, and the isophthalic acid comprised 2.26 moles. Thus the acid and total amine content were in the molar ratio of 1 to 1. The temperature of the mixture rose to about 120° C. during the amine addition.

Thereafter the kettle was heated and arranged to collect the distillate.

At about 126° C. a clear distillate comprising the water charged initially commenced coming off. At about 170° C. an amount of distillate equal to the water charged initially had been collected (432 parts). Fifty minutes later the temperature reached 180.5° C.

Heating was continued and distillate collected until the temperature of the mixture reached 215.5° C. The mixture was then cooled to room temperature after discharge from the kettle. A total of 754 parts of water had been collected.

The pre-polymer had an intrinsic viscosity of 0.12. A 40% solids solution was prepared and adjusted to a pH of 9.0 with formic acid. The viscosity of this solution was 320 centistokes at 25° C.

*Example 6*

This example illustrates the preparation of a wet strength resin from the pre-polymer of Example 5 using epichlorohydrin as a cross-linking agent.

Sixty-four parts of the pre-polymer of Example 5 were placed in a resin kettle along with 122 parts of methanol and 58 parts of epichlorohydrin. The temperature was raised to between 55° and 63° C. As the heating progressed a sample was withdrawn at various times, cooled to 25° C. rapidly, and used to measure the viscosity of the mixture at 25° C.

During the reaction period the resin thickened substantially and increments of water were added to keep the material liquid. A total of 334 parts of water were added, and after a total elapsed time of 2¼ hours the resin was cooled to room temperature. Thereafter a weight of water equal to the total weight of resin was added, whereupon the resin had the following constants:

Solids content _____percent__ 17.8
Viscosity @ 25° C. _____centistokes__ 27
pH approximately _____ 8.4

*Example 7*

The resin produced in Example 6 was allowed to age for 6 days and then diluted with an equal volume of water. The material was then heated at about 50° C. until its viscosity measured @ 25° C. was 83 centistokes. Adiditional water was added in an amount to provide a solids content of 6.8%. The final viscosity @ 25° C. was 46 centistokes, and the pH was 7.5.

*Example 8*

This example illustrates the wet and dry strength results obtained on paper which included the resins of Examples 6 and 7.

The procedure of Example 4 was followed to produce the paper except that the resins of Examples 6 and 7 were added to the slurry. Control sheets without resin were also made. The results were as follows:

TABLE B

| Resin Content of Handsheet (percent) | Resin from— | Wet Tensile Strength in lbs./in. of Width | |
|---|---|---|---|
| | | Off Machine Conditions | Total Cure Conditions |
| 0 (control sheet) | | 0.65 | 0.66 |
| 0.5 | Example 6 | 3.18 | 5.41 |
| 0.5 | Example 7 | 3.39 | 5.08 |

The paper industry uses substantial quantities of mineral fillers to enhance the properties of paper. Materials such as clay, titanium dioxide, diatomaceous earth, barium sulfate, calcium carbonate, and the like, are typical of such fillers. In some cases, the filler also acts as a pigment to provide color or increased "whiteness" to the sheet. Therefore, mixtures of fillers are employed such as clay and titanium dioxide when a combination of properties is desired.

Accepted practice involves the addition of the filler in finely divided form to the pulp slurry. In general, from about 10 to 60 percent of the filler is used based on the pulp weight; the exact amount being determined by the properties desired in the finished paper.

A proportion of the finely divided filler is retained by the paper web as it is formed, however some of the filler passes through the web with the white water and is lost. Such loss represents an obvious economic waste and the lost filler is an undesirable pollutant.

Very small quantities of the resin, heretofore described, when dispersed in the slurry have been found to substantially increase the amount of filler retained by the paper sheet.

In general, amounts from about 0.01% to about 0.1% of resin solids, based on the fiber weight, have been found to be effective.

The slurry is formed by dispersing pulp in water followed by addition of the filler in finely divided form. Thereafter paper-maker's alum is added to solidify the slurry and the desired amount of resin is then added. After all the components are thoroughly dispersed, the sheet is formed in conventional manner.

The order of addition of the components is not critical as long as thorough dispersion is accomplished before the sheet is formed. Thus it is possible to add the resin before the filler.

The following example illustrates a method of increasing the filler retained in paper sheets by use of the resin prepared in accordance with Example 3.

*Example 9*

A pulp slurry was prepared essentially as described in Example 4. While the pulp was being dispersed, 0.13 part of clay and 0.05 part of titanium dioxide were also dispersed in the slurry for each part of dry pulp. Thereafter, 1.5% of paper-maker's alum, based on the pulp weight, was added, followed by 0.05% of the resin solids of Example 3; the percentage being based on the dry pulp weight.

A control slurry which contained no resin but which contained identical amounts of all the other ingredients was prepared in a like manner.

Handsheets were then formed from both pulp slurries in a sheet mold and dried.

The dry sheets were then placed in a crucible and completely burned to determine the amount of ash in the sheet, which in turn was indicative of the total amount of filler and pigment retained by the sheet. This amount was then compared with the amount of filler and pigment added initially to the slurry for those sheets and the percentage of filler and pigment retained calculated. This figure was then compared with the same figure determined on the control sheet which was prepared without resin.

The following results were obtained:

TABLE C

| Resin Added to Pulp Slurry | Percent of Filler and Pigment Retained |
|---|---|
| 0 (Control) | 14.8 |
| 0.05% of resin of Example 3 | 78.9 |

What is claimed is:

1. The method of making a cationic, water soluble, thermosetting resin comprising:
    forming a pre-polymer by reacting about 1 mole of isophthalic acid with about 2 moles of primary amine groups present as a mixture of diethylene triamine and triethylene tetramine,
    said reaction being conducted within a temperature range between about 160° C. and 220° C. while simultaneously distilling water from the pre-polymer,
    continuing the reaction within said temperature range until the intrinsic viscosity of the pre-polymer is between about 0.090 and 0.150, terminating the reaction by cooling the pre-polymer to below about 160° C.,
    partially reacting said cooled pre-polymer with a cross-linking agent to form a thermosetting resin,
    said cross-linking agent comprising the water soluble aqueous reaction product of from 2 to 3 moles of epichlorohydrin with 1 mole of ammonia,
    said reaction being conducted within a temperature range of about 55° C. to 80° C.,
    and terminating the cross-linking reaction while the resin is in a water soluble state by cooling the resin below about 40° C.

2. The method of making a cationic, water soluble, thermosetting resin comprising:
    forming a pre-polymer by reacting about 1 mole of isophthalic acid with about 1 mole of triethylene tetramine,
    said reaction being conducted within a temperature range between about 180° C. and 220° C. while simultaneously distilling water from the pre-polymer,
    continuing the reaction within said temperature range until the intrinsic viscosity of the pre-polymer is between about .090 and .150, terminating the reaction by cooling the pre-polymer to below about 180° C.,
    partially reacting said cooled pre-polymer with a cross-linking agent comprising the water soluble aqueous reaction product of from 2 to 3 moles of epichlorohydrin with 1 mole of ammonia,
    said reaction being conducted within a temperature range of about 55° C. to 80° C.,
    and terminating the cross-linking reaction while the resin is in a water soluble state by cooling the resin below about 40° C.

3. The method of making a cationic, water soluble, thermosetting resin comprising:
    forming a pre-polymer by reacting about 1 mole of isophthalic acid with about 1 mole of triethylene tetramine,
    said reaction being conducted within a temperature range between about 180° C. and 220° C. while simultaneously distilling water from the pre-polymer,
    continuing the reaction within said temperature range until the intrinsic viscosity of the pre-polymer is between about .090 and .150, terminating the reaction by cooling the pre-polymer to below about 180° C.,
    partially reacting said cooled pre-polymer with a cross-linking agent comprising the water soluble aqueous reaction product of from 2 to 3 moles of epichlorohydrin with 1 mole of ammonia,
    said cross-linking agent being present in an amount between about 0.9 to 1.5 moles per mole of secondary amine groups present in the pre-polymer,
    said reaction being conducted within a temperature range of about 55° C. to 80° C.,
    and terminating the cross-linking reaction while the resin is in a water soluble state by cooling the resin below about 40° C.

References Cited

UNITED STATES PATENTS

| 2,849,411 | 8/1958 | Lehmann et al. | 260—29.2 |
| 2,926,154 | 2/1960 | Keim | 260—29.2 |
| 2,969,302 | 1/1961 | Green | 162—164 |
| 3,049,469 | 8/1962 | Davison | 162—164 |
| 3,125,552 | 3/1964 | Loshaek et al. | 260—78 |
| 3,132,112 | 5/1964 | Bartolomeo et al. | 260—2.1 |
| 3,224,990 | 12/1965 | Babcock | 260—78 |

JOSEPH L. SCHOFER, *Primary Examiner.*

DONALL H. SYLVESTER, *Examiner.*

S. L. BASHORE, L. G. CHILDERS, J. KIGHT III,
*Assistant Examiners.*